United States Patent
Narayanan et al.

(10) Patent No.: US 12,198,290 B1
(45) Date of Patent: Jan. 14, 2025

(54) GARMENT PATTERN GENERATION FROM IMAGE DATA

(71) Applicant: Amazon Technologies, Inc., Seattle, WA (US)

(72) Inventors: Vidya Narayanan, Palo Alto, CA (US); Yuxuan Mei, Seattle, WA (US); Seungbae Bang, Santa Clara, CA (US); Sunil Sharadchandra Hadap, Dublin, CA (US)

(73) Assignee: Amazon Technologies, Inc., Seattle, WA (US)

( * ) Notice: Subject to any disclaimer, the term of this patent is extended or adjusted under 35 U.S.C. 154(b) by 104 days.

(21) Appl. No.: 18/067,275

(22) Filed: Dec. 16, 2022

(51) Int. Cl.
| | |
|---|---|
| G06T 17/20 | (2006.01) |
| G06T 3/067 | (2024.01) |
| G06T 7/10 | (2017.01) |
| G06T 7/194 | (2017.01) |
| G06T 19/20 | (2011.01) |
| G06V 10/48 | (2022.01) |

(52) U.S. Cl.
CPC ............... *G06T 3/067* (2024.01); *G06T 7/10* (2017.01); *G06T 7/194* (2017.01); *G06T 17/20* (2013.01); *G06T 19/20* (2013.01); *G06V 10/48* (2022.01); *G06T 2207/30196* (2013.01); *G06T 2210/16* (2013.01)

(58) Field of Classification Search
None
See application file for complete search history.

(56) References Cited

U.S. PATENT DOCUMENTS

| | | | |
|---|---|---|---|
| 9,460,557 B1* | 10/2016 | Tran ..................... | G06T 15/205 |
| 10,607,411 B1* | 3/2020 | Pezzino ................ | G06T 7/337 |
| 2002/0130890 A1* | 9/2002 | Karatassos ............ | G06T 19/00 |
| | | | 345/634 |

(Continued)

OTHER PUBLICATIONS

Bang, Seungbae, et al. "Estimating Garment Patterns from Static Scan Data." Computer Graphics Forum, vol. 40, No. 6, Sep. 2021, pp. 273-287. DOI.org (Crossref), https://doi.org/10.1111/cgf.14272.

(Continued)

*Primary Examiner* — Joni Hsu
(74) *Attorney, Agent, or Firm* — Knobbe, Martens, Olson & Bear, LLP

(57) ABSTRACT

Systems and methods are provided for generating a flat garment pattern and/or 3D mesh representation of a garment from one or more images depicting the garment laid flat or hung up. A system may obtain both a front image depicting a front view of a garment and a back image depicting a back view of the garment. A front and back silhouette of the garment may then be generated, which may include segmenting the garment depiction from background image content. A parametric representation of the garment may then be generated based on the front and back silhouettes, which may be implemented by iteratively optimizing, using differentiable rendering techniques, a garment representation within a parametric garment space previously learned for the particular garment type. A 3D mesh garment representation may then be generated based on the parametric representation, from which a flat sewing pattern may subsequently be generated if desired.

20 Claims, 7 Drawing Sheets

(56) References Cited

U.S. PATENT DOCUMENTS

| | | | | |
|---|---|---|---|---|
| 2011/0273457 | A1* | 11/2011 | De Aguiar | G06T 13/20 345/474 |
| 2017/0105468 | A1* | 4/2017 | Ngo Ngoc | G06F 30/00 |
| 2019/0043269 | A1* | 2/2019 | Lin | G06T 7/62 |
| 2020/0066029 | A1* | 2/2020 | Chen | G06T 15/205 |
| 2020/0320769 | A1* | 10/2020 | Chen | G06F 18/214 |
| 2021/0342495 | A1* | 11/2021 | Mohammed | G06F 30/12 |

OTHER PUBLICATIONS

Bartle, Aric, et al. "Physics-Driven Pattern Adjustment for Direct 3D Garment Editing." ACM Transactions on Graphics, vol. 35, No. 4, Jul. 2016, pp. 1-11. DOI.org (Crossref), https://doi.org/10.1145/2897824.2925896.

Brouet, Remi, et al. "Design Preserving Garment Transfer." ACM Transactions on Graphics, vol. 31, No. 4, Aug. 2012, pp. 1-11. DOI.org (Crossref), https://doi.org/10.1145/2185520.2185532.

Goto, Chihiro, and Nobuyuki Umetani. "Data-Driven Garment Pattern Estimation from 3D Geometries." The Eurographics Association, 2021. diglib.eg.org, https://doi.org/10.2312/egs.20211013.

Korosteleva, Maria, and Sung-Hee Lee. "Generating Datasets of 3D Garments with Sewing Patterns." arXiv:2109.05633, arXiv, 12 Sep. 2021. arXiv.org, http://arxiv.org/abs/2109.05633.

Korosteleva, Maria, and Sung-Hee Lee. "NeuralTailor: Reconstructing Sewing Pattern Structures from 3D Point Clouds of Garments." Jun. 27, 2022. arXiv.org, http://arxiv.org/abs/2201.13063.

Loper, Matthew, et al. "SMPL: A Skinned Multi-Person Linear Model." ACM Transactions on Graphics, vol. 34, No. 6, Nov. 2015, pp. 1-16. DOI.org (Crossref), https://doi.org/10.1145/2816795.2818013.

Ma, Qianli, et al. "Learning to Dress 3D People in Generative Clothing." 2020 IEEE/CVF Conference on Computer Vision and Pattern Recognition (CVPR), IEEE, 2020, pp. 6468-6477. DOI.org (Crossref), https://doi.org/10.1109/CVPR42600.2020.00650.

Maria, Korosteleva, and Lee Sung-Hee. "Dataset of 3D Garments with Sewing Patterns." Zenodo, Jun. 8, 2021. DOI.org (Datacite), https://doi.org/10.5281/ZENODO.5267548.

Patel, Chaitanya, et al. "TailorNet: Predicting Clothing in 3D as a Function of Human Pose, Shape and Garment Style." 2020 IEEE/CVF Conference on Computer Vision and Pattern Recognition (CVPR), IEEE, 2020, pp. 7363-7373. DOI.org (Crossref), https://doi.org/10.1109/CVPR42600.2020.00739.

Pietroni, Nico, et al. "Computational Pattern Making from 3D Garment Models." arXiv:2202.10272, arXiv, Feb. 21, 2022. arXiv.org, http://arxiv.org/abs/2202.10272.

Su, Zhaoqi, et al. "DeepCloth: Neural Garment Representation for Shape and Style Editing." IEEE Transactions on Pattern Analysis and Machine Intelligence, 2022, pp. 1-1. DOI.org (Crossref), https://doi.org/10.1109/TPAMI.2022.3168569.

Vidaurre, Raquel, et al. "Fully Convolutional Graph Neural Networks for Parametric Virtual Try-On." Computer Graphics Forum, vol. 39, No. 8, Dec. 2020, pp. 145-156. DOI.org (Crossref), https://doi.org/10.1111/cgf.14109.

Wang, Tuanfeng Y., Duygu Ceylan, et al. "Learning a Shared Shape Space for Multimodal Garment Design." ACM Transactions on Graphics, vol. 37, No. 6, Dec. 2018, pp. 1-13. DOI.org (Crossref), https://doi.org/10.1145/3272127.3275074.

Wang, Tuanfeng Y., Tianjia Shao, et al. "Learning an Intrinsic Garment Space for Interactive Authoring of Garment Animation." ACM Transactions on Graphics, vol. 38, No. 6, Dec. 2019, pp. 1-12. DOI.org (Crossref), https://doi.org/10.1145/3355089.3356512.

Yang, Shan, et al. "Physics-Inspired Garment Recovery from a Single-View Image." ACM Transactions on Graphics, vol. 37, No. 5, Nov. 2018, pp. 1-14. DOI.org (Crossref), https://doi.org/10.1145/3026479.

* cited by examiner

GARMENT PATTERN GENERATION FROM IMAGE DATA

BACKGROUND

A number of different computer-implemented approaches have been used for rendering three-dimensional ("3D") representations of items of clothing worn by or draped over a 3D human model. For example, there is often a need in fields such as 3D computer animation to generate a 3D rendering of particularly items of clothing or an entire outfit as worn by a particular 3D character or model in a manner that appears physically realistic with respect to the clothes' tightness on the particular body, the appearance of wrinkles, the manner in which loose material hangs or falls from particular parts of the body, etc. Draping of clothing on a 3D virtual human body is also useful for a potential purchaser of clothing or a clothing designer to visualize how a particular garment will fit on a particular size and shape of human body. Typically, the actual production of a garment requires a significantly different data representation of the garment (such as flat sewing patterns) than the 3D mesh or similar representation that would typically be used by a computer to render a virtual 3D preview of the garment.

BRIEF DESCRIPTION OF DRAWINGS

Embodiments of various inventive features will now be described with reference to the following drawings. The drawings are provided to illustrate example embodiments described herein and are not intended to limit the scope of the disclosure.

DETAILED DESCRIPTION

Figure 1A:
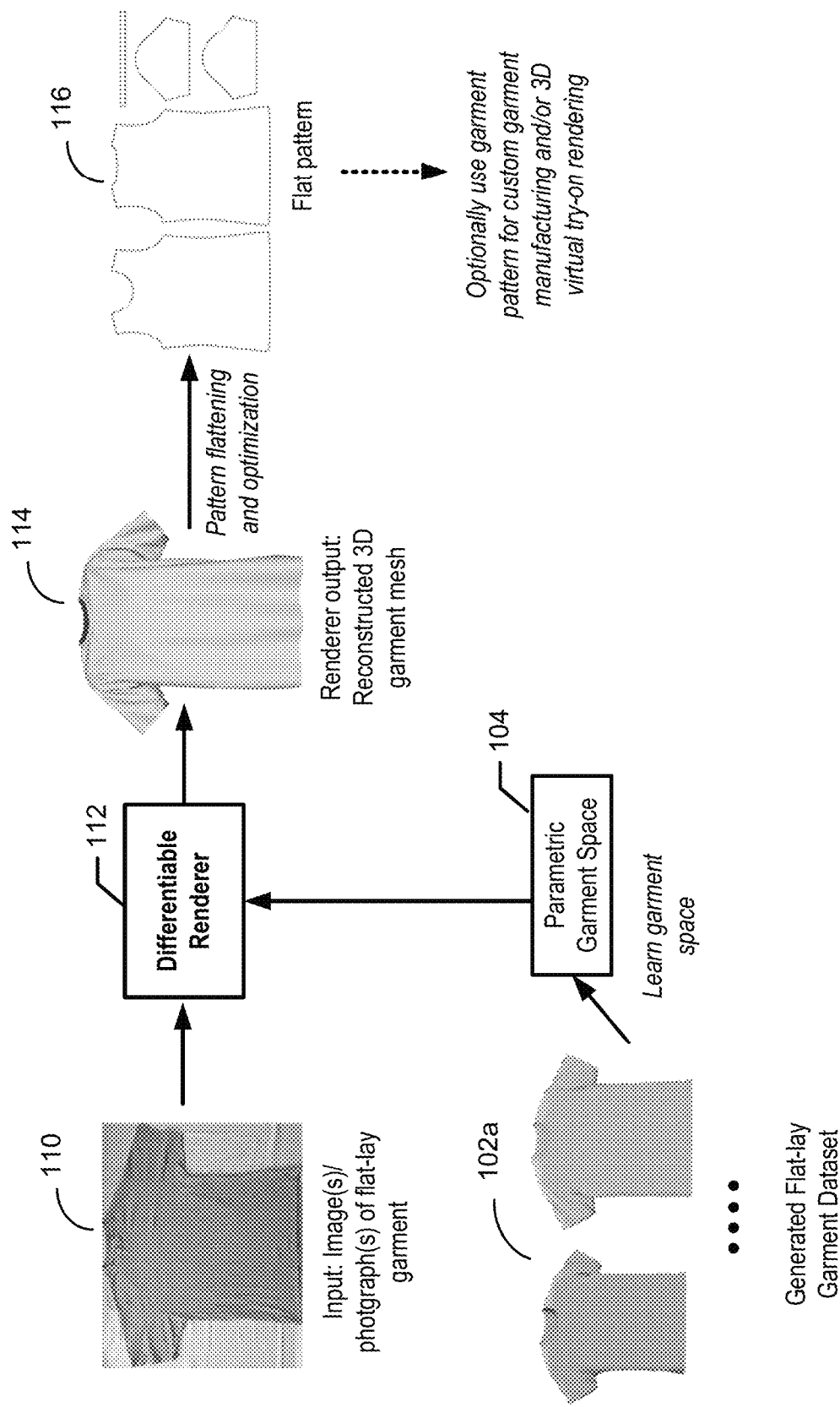
FIG. 1A is a block diagram depicting an overall data flow for learning a parametric garment space and then generating a flat garment pattern from input images of a garment based in part on differentiable rendering, according to some embodiments.

Generally described, aspects of the present disclosure relate to generating a flat sewing pattern and/or a 3D mesh representation of a garment from one or more photographs of the garment. For example, a user can take two photographs (such as one of the front and one of the back of a garment laid flat or hung up), and the photographs may be used to automatically generate a 3D representation of the garment for virtual try-on applications (e.g., existing applications and services for previewing how a garment would appear when worn by a particular person or body type). Alternatively or additionally, the generated 3D representation may be further manipulated through automated flattening operations to generate flat sewing patterns (e.g., multiple flat panels to be sewn or otherwise attached to one another when producing a physical garment) for physically producing new custom instances of the garment, such as in connection with a made-to-measure garment production process. As will be further discuss below, generating the 3D mesh representation of the garment from the images may include providing silhouettes of the front and back of the garment to a differentiable renderer that optimizes a parametric garment representation in a parametric garment space learned for the specific type of garment (such as a shirt).

Virtual try-on and made-to-measure applications typically use as input garments represented as 3D meshes or flat patterns from which 3D meshes can be generated. However, obtaining these garment patterns can be challenging depending on the available data for a particular garment. Aspects of the present disclosure rely on similarities of the underlying topology of garments in a given garment class or garment type (such as different shirts in a shirt class, or pants in a pants class), although their specific geometric details could be different. Given a garment topology (e.g., t-shirts, pants, dresses, etc.), a system described herein may automatically generate a variety of garment variations within the same class. These patterns may then be represented as relatively flat garment meshes (e.g., "as flat as possible" 3D meshes, which may retain some 3D shape in areas such as a collar of a shirt, in which a real instance of the garment would not be able to be fully compressed or laid completely flat) in a parametric space that is substantially flat and retains the shape of a physical real world garment laid out flat. The rendered silhouettes of flat patterns may mimic the silhouettes of garment images. Given an image of a flat-laid garment, a system as described herein may optimize in the parametric garment space using inverse rendering (or differentiable rendering) to match the silhouette of the pattern to that of the image. Given the optimized garment mesh in the known topology, both garment patterns and geometry may be generated or recovered, as will be further described herein.

Approaches described herein are distinct from traditional garment estimation approaches. First, instead of working with garments that are dressed on humans, which can often introduce additional physical effects and complexities, processes described herein may be used to synthetically generate a flat garment dataset to work in the flat garment space. This allows the system to (1) avoid un-doing the influence of physics on garment drapes, and (2) enables the process to work with potentially minimal input image data (such as just two photographs, one showing a front view and one a back view) for generating or estimating a garment pattern. Additionally, consistently flattening a 3D garment representation to an as-flat-as-possible configuration (e.g., nearly 2D) is a problem that has not been addressed or solved in prior systems. While existing simulation systems can be used to achieve potentially similar results with substantial manual interventions to avoid collisions and crumpling of the garment, no manual intervention is required in the geometric approaches described with respect to certain embodiments herein.

In some embodiments, a system described herein may obtain both a front image depicting a front view of a garment and a back image depicting a back view of the garment, such as photographs of the garment laid flat or hung up. The system may either determine from the image or receive an indication from a user of the type of garment, such as a shirt, pants, etc. The system may then generate a front silhouette and a back silhouette of the garment, such as by segmenting each of the front image and back image from background image content. The system may then retrieve data defining a parametric garment space previously learned or generated for the given garment type, which is used by the system to generate a parametric representation of the garment based on the front and back silhouettes of the garment. For example, the parametric representation of the garment may be generated at least in part by iteratively optimizing a garment representation within the parametric garment space using a differentiable renderer. The system may then generate a 3D mesh representation of the garment based on the parametric representation of the garment. If a flat sewing pattern is also desired in the given instance, such as to physically produce one or more instances or variations of the garment, the system may generate the garment pattern at least in part by applying operations to flatten the 3D mesh representation, as will be further discussed herein.

In some embodiments, the parametric garment space for a given garment type may be learned based in part on a potentially large number of artificially generated sample garments. For example, the system may learn the parametric garment space using what is at first only a relatively small set of sample garment patterns for a given garment type, such as shirts, by artificially creating many variations of the sample garment patterns by interpolating those reference patterns. The system may then virtually drape, in virtual 3D space, 3D meshes representing each garment in the sample set of garment patterns to generate draped 3D garment meshes. The system may then generate a flattened version of each of those draped 3D garment meshes, from which the system generates a low-dimensional embedding to represent each flattened version. The system may then store and associate with the first garment type, in an electronic data store, data defining the corresponding learned parametric garment space that contains the low-dimensional embeddings of the sample set.

FIG. 1A is a block diagram depicting an overall data flow for learning a parametric garment space and then generating a flat garment pattern from input images of a garment based in part on differentiable rendering, according to some embodiments. While FIG. 1A depicts both learning the parametric garment space 104 and using the learned space to generate a flat pattern from input images of a garment, it will be appreciated that the parametric garment space may be learned in advance and then reused for a number of instances of generating 3D meshes and/or garment patterns from various photographs of different garments.

As depicted in FIG. 1A, a generated flat-lay garment dataset 102a may be used to learn the parametric garment space 104 for a particular garment type of garment class, which in the illustrated example may be shirts. Different parametric garment spaces may be learned from datasets for other garment types, such as dresses, coats, pants, etc. Methods for generating the dataset 102a and subsequently learning the parametric garment space 104 will be further described below, such as with respect to FIGS. 1B and 2B. Once the parametric garment space 104 is learned for the shirt garment type, in the example of FIG. 1A, the parametric garment space 104 may be utilized by the differentiable renderer 112 to constrain the process of iteratively optimizing garment representations corresponding to shirts (the garment type in this example) when input images of shirts are provided to the differentiable renderer.

In the example of FIG. 1A, one or more digital photographs of a shirt 110 may be provided to the differentiable renderer 112. In some embodiments, the input images may include two images-one of the front of the shirt and one of the back of the shirt. The photographs may be of the shirt laying flat on a surface, hung on a hanger, hung with pins, or otherwise appearing relatively flat (e.g., not worn on a person). The image(s) of the shirt 110 in combination with the parametric garment space 104 learned for the shirt class or garment type may be used by the differentiable renderer 112 to reconstruct a 3D garment mesh 114 corresponding to the input shirt 110. More details regarding the operation of the differentiable renderer will be further described below, such as with respect to FIGS. 2A and 3.

While the 3D garment mesh 114 is shown or rendered as a solid surface in FIG. 1A, it will be appreciated that the 3D garment mesh may be represented in data as a number of triangles or vertices defined by their position in virtual 3D space. In some embodiments, each garment within a particular garment class or type may have the same number of vertices and/or faces (e.g., the same triangulation) as one another. In some embodiments, data may be stored or defined in advance for the particular garment class indicating which vertices or faces correspond to which panel of a garment (e.g., vertices 1-10 correspond to a left arm panel, vertices 11-26 correspond to a front shirt panel, etc.).

Once the 3D garment mesh 114 has been generated, pattern flattening operations and optimization may be applied to generate a flat pattern (or sewing pattern) 116. Methods for generating the flat pattern 116 from the 3D mesh 114 will be further described below, such as with reference to FIG. 4. As shown, the flat pattern may include a number of different panels (e.g., two arm panels, a collar, and a front panel and back panel in the illustrated example) representing different pieces of fabric that may be sewed together (such as using associated sewing instructions indicating edges to be attached to one another during physical production of the garment) to produce an instance of the garment. If desired in the given embodiment, the flat pattern may be used for custom or made-to-measure garment manufacturing, such as in connection with modifying the sizing of the pattern to accommodate a particular human body size that may differ from the size of the actual photographed garment instance in the input images 110. Additionally or alternatively, the 3D mesh and/or flat pattern 116 may be used by a computing system for virtual try-on services or applications, such as to render the garment on a virtual 3D human body (using known draping techniques, for example).

Figure 1B:
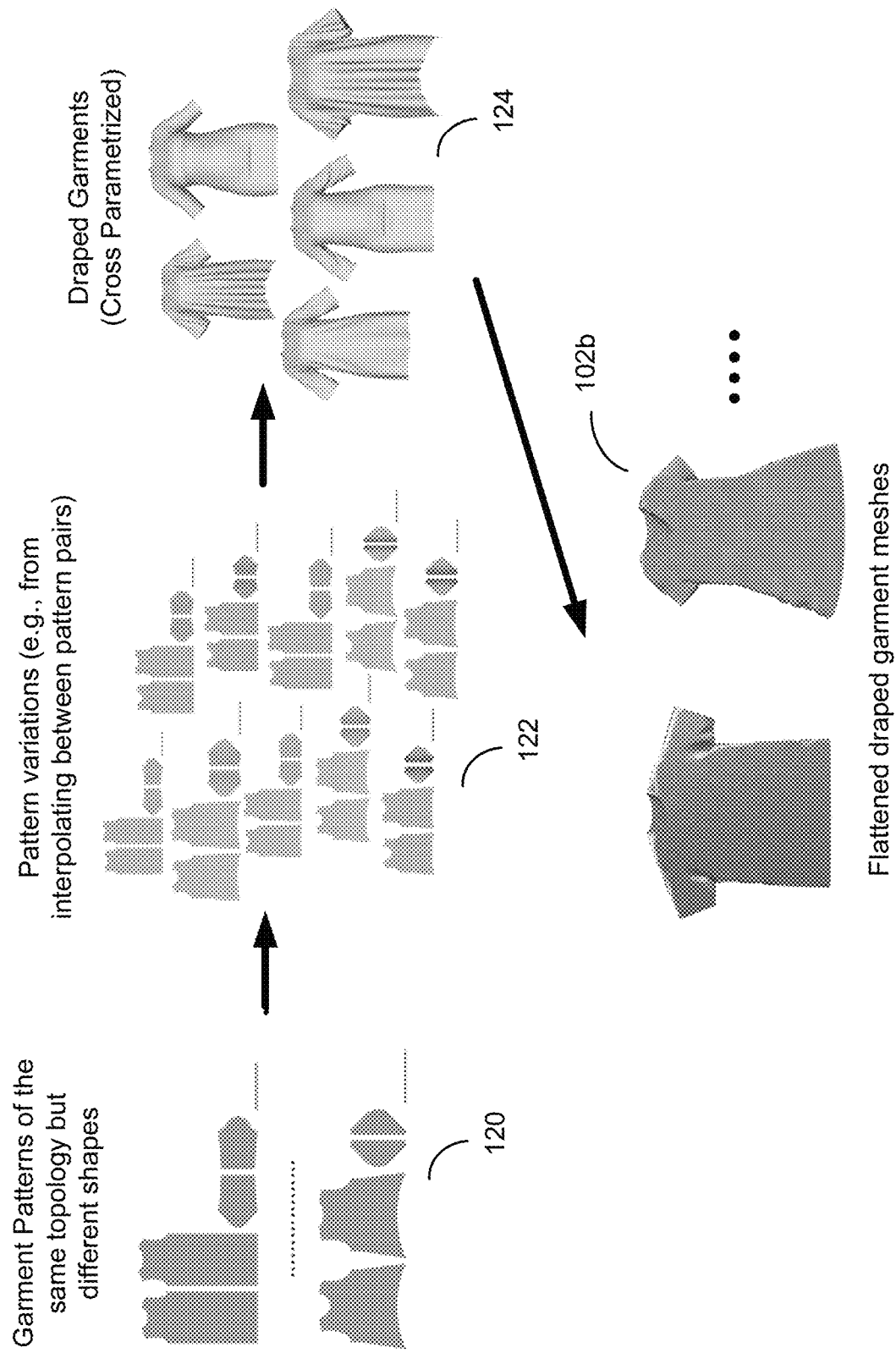
FIG. 1B is a block diagram of a series of graphical depictions of garment representation data at various steps of creating a flat-lay garment dataset, according to some embodiments.

FIG. 1B is a block diagram of a series of graphical depictions of garment representation data at various steps of creating a flat-lay garment dataset, according to some embodiments. The eventual flat-lay dataset, or flattened draped garment meshes 102b, may ultimately be used, as described above with respect to dataset 102a of FIG. 1A, to generate the parametric garment space for a particular garment type.

As shown in FIG. 1B, various garment patterns 120 that share the same topology as one another (e.g., the same vertex-face structures, despite being differently proportioned and/or shaped) may initially be accessible to the system described herein. These initial garment patterns 120 may be in the same garment class as one another, in this case shirts. In order to produce a larger sample dataset 122 than may be available in an existing data repository, the system may generate a potentially large number of variations of the patterns 120, such as by interpolating between pattern pairs of initial patterns 120. In some embodiments, the variety of interpolated variations of the garments 122 may include one thousand or more garment variations produced from a small handful of initial curated garment patterns 120 (such as ten or less in one embodiment).

As discussed above, the pattern variations 122 and/or curated garment patterns 120 may then each be draped on the same virtual 3D human body. The result shown as draped garments 124 (only a small subset of which are shown in the figure) may be the result of the garments 120 and 122 each being represented as 3D meshes (each with the same triangulation structure) with wrinkle dynamics and physics applied using known draping approaches, as will be further discussed below. The mesh representations may be cross-parametrized before further processing.

In some embodiments, each garment mesh of draped garments 124 may initially consist of many vertices and triangles (such as O(10,000)). The system may generate a low-dimensional embedding, such as using principal component analysis ("PCA") and spectral embedding, to represent these garments with a substantially lower number of parameters, such as O(1,000) parameters. This parametric representation may be unique to the dataset (such as the combination of patterns 120 and 122) used to generate it. The draped garments 124 may then be flattened, using techniques that will be further described below, in order to produce the flattened draped garment meshes 102*b*.

Figure 2A:
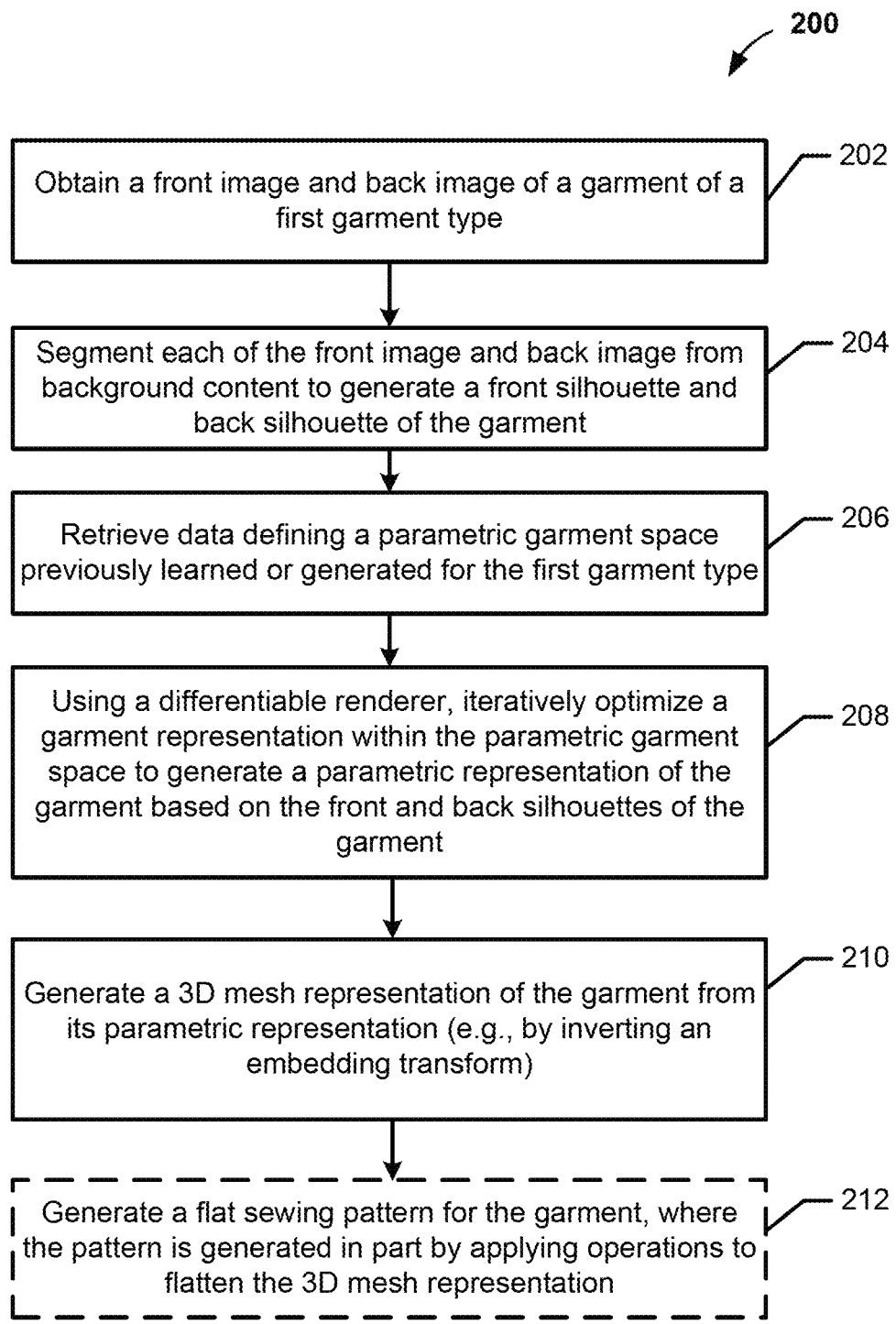
FIG. 2A is a flow diagram of an illustrative method for generating a 3D mesh representation of a garment and optionally a flat sewing pattern for the garment based on images depicting a produced instance of the garment, according to some embodiments.

FIG. 2A is a flow diagram of an illustrative method 200 for generating a 3D mesh representation of a garment and optionally a flat sewing pattern for the garment based on images depicting a produced instance of the garment, according to some embodiments. The method 200 may be performed by the computing system 502, which will be further described below with reference to FIG. 5.

The illustrative method 200 begins at block 202, where the system may receive one or more input images of a garment, such as a front image and back image of a garment of a first garment type. As discussed above, the garment type may be determined by the system from image analysis, or may selected by a user, such as a user that provides the garment images to the system. In some embodiments, the images of the garment may be provided over a network to the system, such as from a user's mobile phone or other device, from which the user utilized a camera to photograph a garment. In some embodiments, a page or user interface presented on the user's device may guide the user through capturing the images, such as instructing the user to lay the garment flat and photograph it from the front and back. In other embodiments, the images of the garment may be retrieved from a retailer's or garment manufacturer's electronic catalog, such as marketing images for a garment listed for sale.

At block 204, the system may segment each of the front image and back image from background content to generate a front silhouette and back silhouette of the garment. For example, if the garment has not been photographed against a white or solid color background, known segmenting techniques may be applied to isolate the garment shape from background content such as a table, floor, closet, etc. that may appear in a photograph of the garment. The silhouette of the garment may be generated from the segmented image using known techniques.

Next, at block 206, the system may retrieve data defining a parametric garment space previously learned or generated for the given garment type (such as a shirt). An illustrative method for learning such a parametric garment space will be described below with respect to FIG. 2B.

At block 208, the system may, using a differentiable renderer, iteratively optimize a garment representation within the parametric garment space (retrieved at block 206) to generate a parametric representation of the garment based on the front and back silhouettes of the garment. As will be further discussed below with respect to FIG. 3, block 208 may include, in each of a number of iterations, determining a loss between a rendered image of the garment (generated by the differentiable renderer) and the reference silhouette of the garment (determined at block 204 above).

An existing differentiable renderer may be used in the rendering pipeline that will be described further below with respect to FIG. 3. Differentiable rendering generally allows 2D image pixels to be related back to 3D properties of a scene. For example, by rendering a 2D image from a 3D representation of the garment, the system can compute a 2D loss with the reference image. Inverting the rendering step means that the system can relate the 2D loss from the pixels back to the 3D properties of the shape, such as the positions of mesh vertices. This enables 3D shape information to be learned without explicit 3D supervision. As will be further discussed below with reference to FIG. 3, the optimizing in some embodiments may be over PCA parameters rather than directly representing the garment as vertices and faces when computing the loss function.

At block 210, the system may generate a 3D mesh representation of the garment from its parametric representation. In some embodiments, this may be implemented at least in part by inverting an embedding transform. Optionally, such as in embodiments in which physical production of the garment is desired, the system may then generate a flat pattern (e.g., a sewing pattern) for the garment at block 212. The flat pattern may be generated by applying operations to flatten the 3D mesh representation generated at block 210. For example, flattening the 3D mesh may include constraining normals of triangles of the 3D mesh representation to remain parallel to a compression direction, while constraining a shape of a 2D view of the 3D mesh representation to correspond to an original shape of the garment. Flattening operations will be described in more detail below with respect to FIG. 4.

Figure 2B:
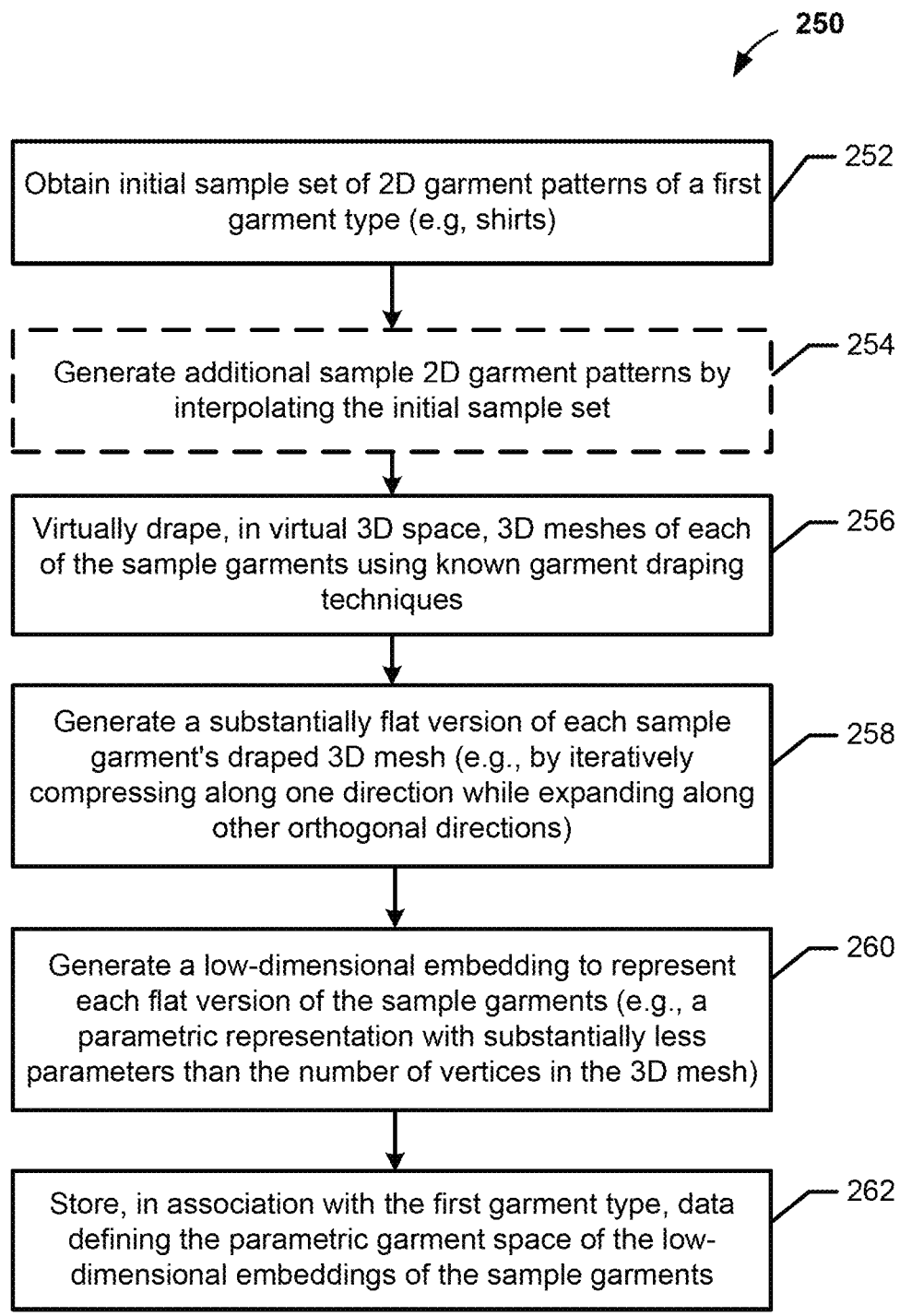
FIG. 2B is a flow diagram of an illustrative method for learning a parametric garment space for a certain garment type, according to some embodiments.

FIG. 2B is a flow diagram of an illustrative method 250 for learning a parametric garment space for a certain garment type, according to some embodiments. The method 250 may be performed by the computing system 502, which will be further described below with reference to FIG. 5.

The method 250 begins at block 252, where the system may obtain an initial sample set of 2D garment patterns of a first garment type (e.g., shirts) for which the garment space will be learned in the given instance. If a greater variety and/or number of samples is desired or beneficial given the available samples, the system may optionally generate a large number of additional sample 2D garment patterns by interpolating the initial sample set, at block 254. Generating additional sample patterns via interpolation was described earlier above.

At block 256, the system may virtually drape, in virtual 3D space, 3D meshes of each of the sample garments using known garment draping techniques. Garment draping is an existing component in (among other applications) virtual try-on systems, such as systems that enable a user to see a preview or rendering of how a particular clothing garment or outfit would fit on a virtual avatar or virtual body resembling the user's actual body. With the help of a well-trained draping network, virtual try-on systems can predict quickly and accurately how garments look and fit on a body. A number of different approaches have been used for garment draping simulation, and the present disclosure does not rely on a particular draping approach to be used.

Generally, drape prediction systems or simulators have tended to focus on either physics-based cloth simulation or learning-based garment generation. Physics-based garment simulation systems may include spatial discretization and different forms of simulations. As a faster alternative to simulation, learning based approaches have been developed for draping garments, including normal map generation, KNN body garment fusion, displacement regression, and least square approximation, among others. Certain methods for draping simulation capable of taking a human body mesh as input and directly regressing a garment mesh as output with realistic geometric details are described in U.S. patent application Ser. No. 17/478,655, to Liang et al., entitled "VIRTUAL GARMENT DRAPING USING MACHINE LEARNING." Further details regarding how a system may take a 2D garment pattern and generate a corresponding draped 3D mesh are described in (such as with respect to FIG. 4 therein) U.S. patent application Ser. No. 17/701,556, to Liang et al., entitled "VIRTUAL GARMENT WRAPPING FOR DRAPING SIMULATION." which is hereby incorporated by reference herein.

At block 258, the system may generate a substantially flat version (e.g., as flat as possible given constraints that will be described below) of each sample garment's draped 3D mesh. In some embodiments, this may be implemented by iteratively compressing the mesh along one direction while expanding along other orthogonal directions. Operations for flattening a garment mesh will be further described below with reference to FIG. 4.

Then, at block 260, the system may generate a low-dimensional embedding to represent each flat version of the sample garments. As previously discussed, the low-dimensional embedding for each garment may be a parametric representation with substantially less parameters than the number of vertices in the 3D mesh, such as ten times less in one embodiment. The low-dimensional embedding for each garment may be generated, for example, using PCA and spectral embedding.

At block 262, data defining the parametric garment space of the resulting low-dimensional embeddings of the sample garments may then be stored in an electronic data store and associated or tagged with the given garment type or class (e.g., shirts). The data defining the parametric garment space may later be retrieved and used in the future when generating 3D mesh representations of previously unseen input garment images falling within the given class (e.g., newly photographed shirts), as described above with respect to FIG. 2A.

Figure 3:
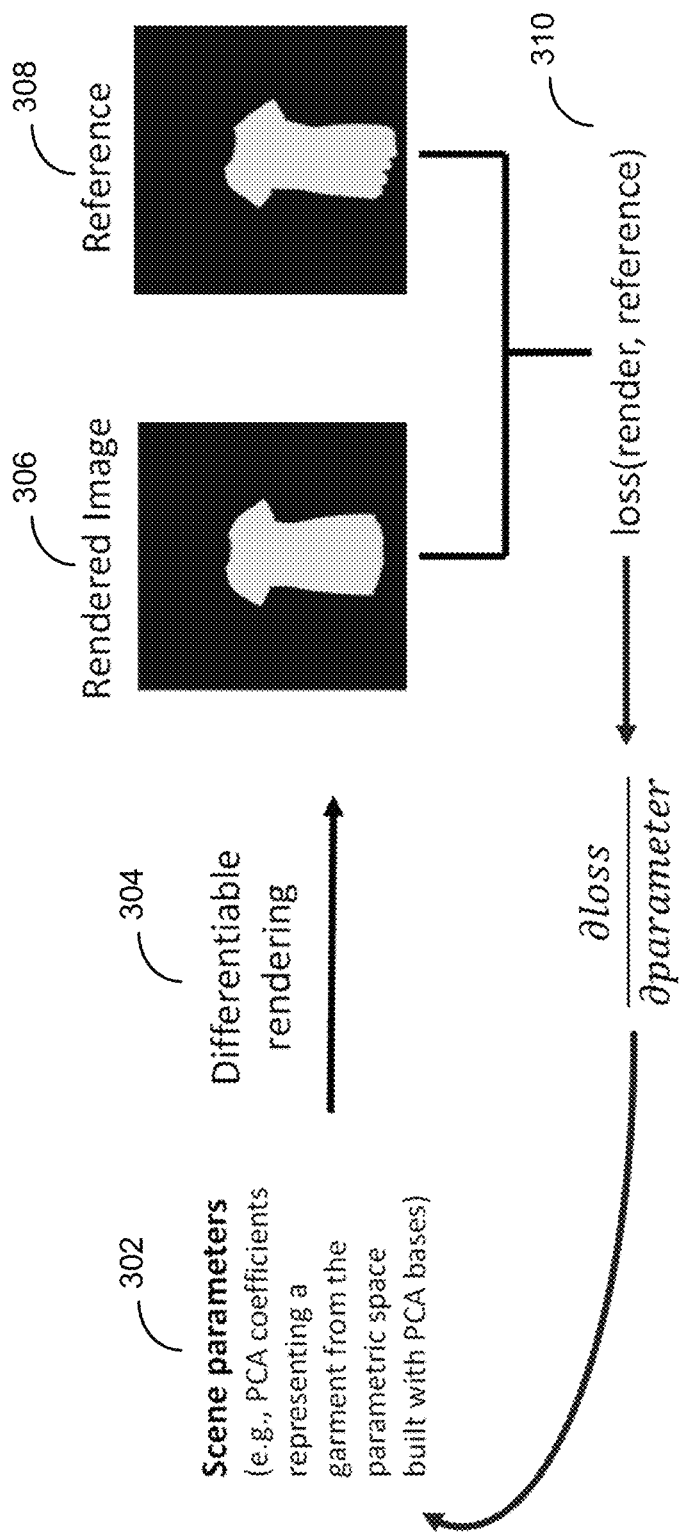
FIG. 3 is a block diagram depicting steps in optimizing scene patterns for a garment using a differentiable renderer, according to some embodiments.

FIG. 3 is a block diagram depicting steps in optimizing scene patterns for a garment using a differentiable renderer, according to some embodiments. As discussed above, differentiable rendering 304 may be performed with soft rasterization to begin to render garments in front and back views using an initial parametric garment representation from the previously learned parametric representation space for the given garment type. The system may iteratively optimize in the parametric representation space, such as using gradient descent and a loss function that compares the silhouette of the actual photographed reference garment 308 to the generated/rendered garment silhouette 306. In some embodiments, the loss function applied at step 310 with respect to the silhouettes 306 and 308 may be L2-norm.

In some embodiments, the scene parameters 302 that are adjusted in successive passes of the differentiable rendering 304 of FIG. 3 may be PCA coefficients representing a garment from the parametric space, built with PCA bases. Optimizing over PCA parameters may lead to better results than directly representing the garment as vertices and faces at this stage, which failed to produce smooth meshes in testing. Furthermore, instead of optimizing all parameters at once, the system may optimize in a hierarchical fashion, given that the PCA parameters are hierarchical. For example, the PCA parameters may be optimized hierarchically since a first subset of the coefficients may correspond to more important variations in the dataset than the later coefficients, and it may thus be more important to optimize for these earlier coefficients. Optimization may continue until an acceptable loss threshold (which may be predetermined) is reached, according to some embodiments.

Figure 4:
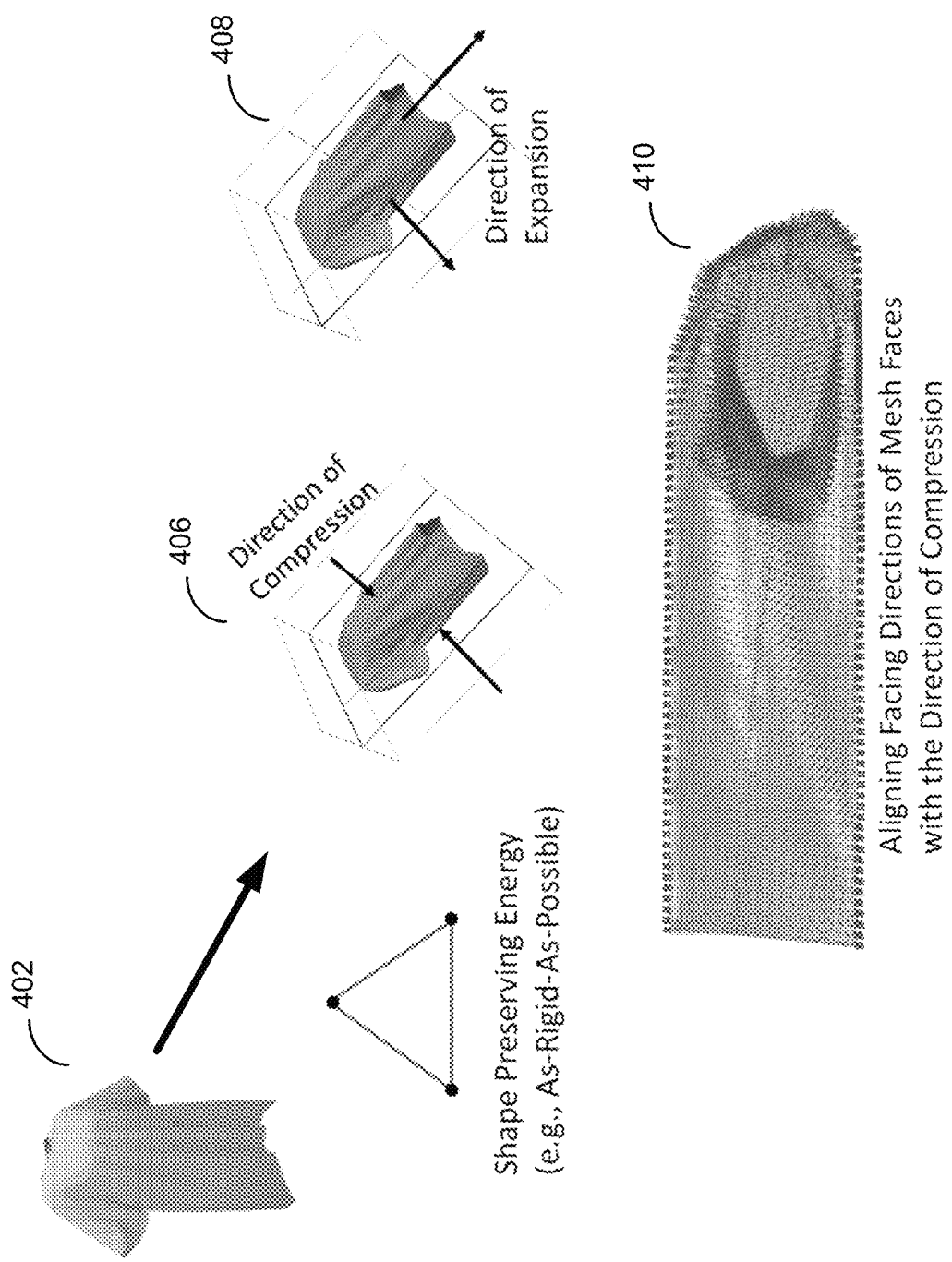
FIG. 4 provides visualizations of operations that may be applied to flatten a garment mesh, according to some embodiments.

FIG. 4 provides visualizations of operations that may be applied to flatten a garment mesh, according to some embodiments. The initial garment mesh 402 may be manipulated using shape preserving energy (e.g., flattening with as-rigid-as-possible parametrization). The system may be configured to generally preserve the garment shape while compressing in one direction (compression direction shown in visualization 406) and expanding in orthogonal directions (shown in visualization 408). In some embodiments, triangles closer to the surface may be compressed/expanded more than others. Additionally, as shown in visualization 410, the system may also attempt to align the facing directions of the mesh faces with the direction of compression (e.g., the direction as shown in visualization 406).

The above mesh manipulations may generally virtually mimic the process of attempting to lay a physical garment flat on a table and spreading it out. The flattening manipulations also lead to a more realistic resulting garment shape than if the silhouette of the initial garment mesh 402 were used. This is because the initial shape of the perimeter or silhouette of the garment 402 is initially arranged such that it has been affected by wrinkle dynamics, waves and/or concave regions resulting from draping and/or physics.

During each of many iterations, the garment triangles' normals may be constrained to remain parallel to the compression direction and its 2D shape constrained to remain similar to the original shape in order to maintain the size of the garment. Bending between adjacent triangles may be minimized to keep the surface generally smooth. In some embodiments, the system may additionally employ compression and alignment constraints, expansion constraints, and/or a bending penalty (e.g., to attempt to keep surfaces flat). The iterations may be applied until no further flattening is possible and/or the garment is sufficiently compressed along one direction.

Figure 5:
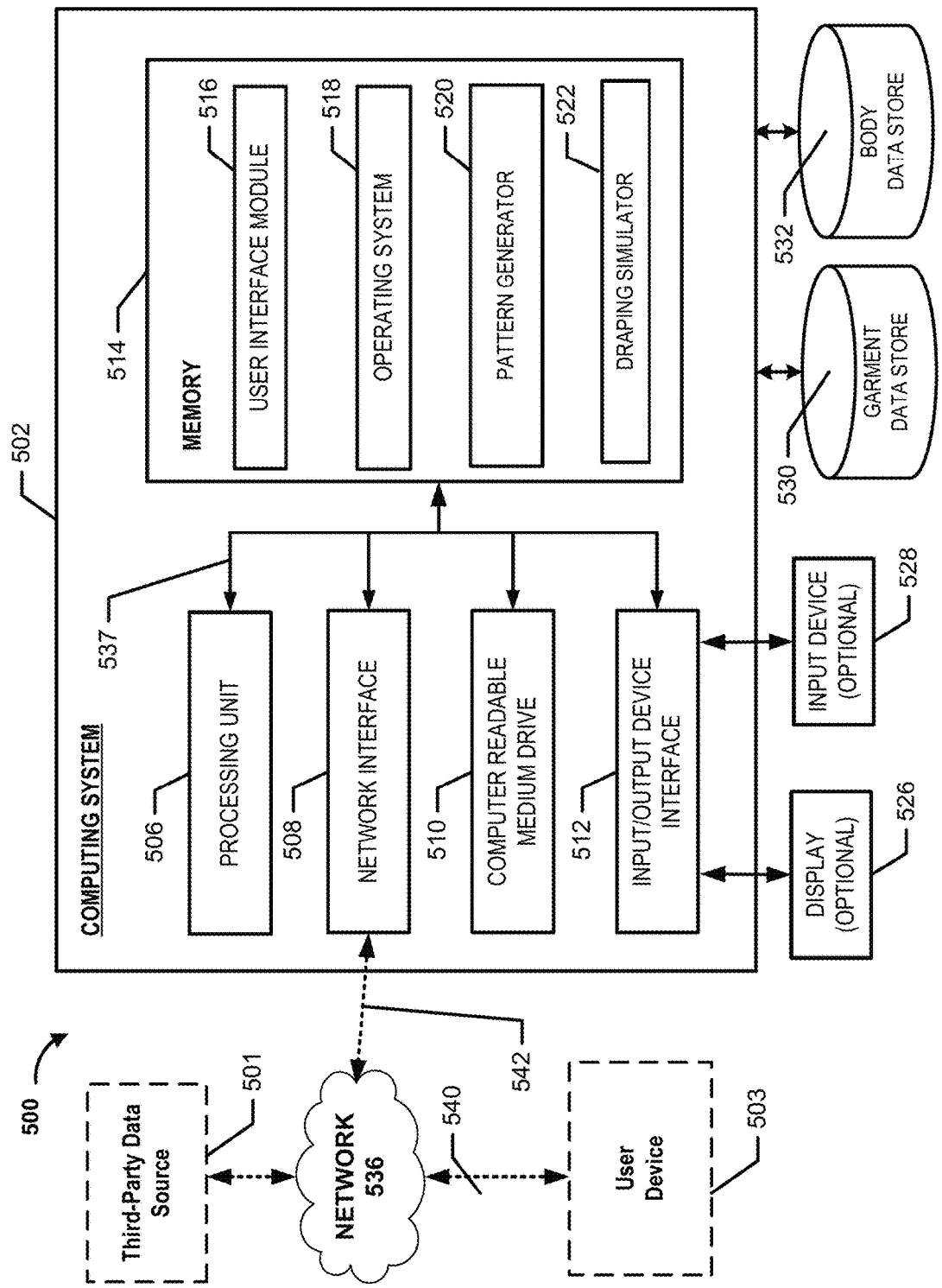
FIG. 5 is a block diagram depicting an illustrative architecture for a computing system that may implement one or more of the features described.

FIG. 5 illustrates a general architecture of a computing environment 500, according to some embodiments. As depicted in FIG. 5, the computing environment 500 may include a computing system 502. The general architecture of the computing system 502 may include an arrangement of computer hardware and software components used to implement aspects of the present disclosure. The computing system 502 may include many more (or fewer) elements than those shown in FIG. 5.

As illustrated, the computing system 502 includes a processing unit 506, a network interface 508, a computer readable medium drive 510, an input/output device interface 512, an optional display 526, and an optional input device 528, all of which may communicate with one another by way of a communication bus 537. The processing unit 506 may communicate to and from memory 514 and may provide output information for the optional display 526 via the input/output device interface 512. The input/output device interface 512 may also accept input from the optional input device 528, such as a keyboard, mouse, digital pen, microphone, touch screen, gesture recognition system, voice recognition system, or other input device known in the art.

The memory 514 may contain computer program instructions (grouped as modules or components in some embodiments) that the processing unit 506 may execute in order to implement one or more embodiments described herein. The memory 514 may generally include RAM, ROM and/or other persistent, auxiliary or non-transitory computer-readable media. The memory 514 may store an operating system 518 that provides computer program instructions for use by the processing unit 506 in the general administration and operation of the computing system 502. The memory 514 may further include computer program instructions and other information for implementing aspects of the present disclosure. For example, in one embodiment, the memory 514 may include a user interface module 516 that generates user interfaces (and/or instructions therefor) for display upon a computing system, e.g., via a navigation interface such as a browser or application installed on a user device 503.

In some embodiments, the memory 514 may include one or more pattern generator components 520 and a draping simulator 522, which may be executed by the processing unit 506 to perform operations according to various embodiments described herein. For example, the pattern generator components 520 may implement various methods described above to generate garment patterns (and the intermediate result of flattened 3D meshes) based on input image data and draping results from the draping simulator 522. The modules or components 520 and/or 522 may access the body data store 532 and/or garment data store 530 in order to retrieve data described above (such as a 3D human body representation and garment patterns) and/or store data (such as generated garment patterns and 3D meshes). The data stores 530 and/or 532 may be part of the computing system 502, remote from the computing system 502, and/or may be a network-based service.

In some embodiments, the network interface 508 may provide connectivity to one or more networks or computing systems, and the processing unit 506 may receive information and instructions from other computing systems or services via one or more networks. In the example illustrated in FIG. 5, the network interface 508 may be in communication with a user device 503 (which may be operated, for example, by a user who provides the input photographs of a garment of interest to the user) via the network 536, such as the Internet. In particular, the computing system 502 may establish a communication link 542 with a network 536 (e.g., using known protocols) in order to send communications to the computing device 503 over the network 536. Similarly, the computing device 503 may send communications to the computing system 502 over the network 536 via a wired or wireless communication link 540. In some embodiments, the computing system 502 may additionally communicate via the network 536 with an optional third-party data source 501, which may be used by the computing system 502 to retrieve garment data (such as in association with an electronic catalog of garments), user body data, and/or other data.

Those skilled in the art will recognize that the computing system 502 and user device 503 may be any of a number of computing systems or devices including, but not limited to, a laptop, a personal computer, a personal digital assistant (PDA), a hybrid PDA/mobile phone, a mobile phone, a smartphone, a wearable computing device, a digital media player, a tablet computer, a gaming console or controller, a kiosk, an augmented reality device, another wireless device, a set-top or other television box, one or more servers, and the like. The user device 503 may include similar hardware to that illustrated as being included in computing system 502, such as a display, processing unit, network interface, memory, operating system, etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or one or more computer processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "could," "might." "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising." "including." "having." and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z." unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   memory; and
   at least one computing device configured with computer-executable instructions that, when executed, cause the at least one computing device to:
   obtain (a) a front image depicting a front view of a garment and (b) a back image depicting a back view of the garment, wherein the garment is of a first garment type, wherein the front image and back image each depict the garment laid flat or hung up;
   generate a front silhouette and a back silhouette of the garment at least in part by segmenting each of the front image and back image from background image content;
   retrieve data defining a parametric garment space previously learned or generated for the first garment type;
   generate a parametric representation of the garment based on the front and back silhouettes of the garment, wherein the parametric representation of the garment is generated at least in part by iteratively optimizing a garment representation within the parametric garment space using a differentiable renderer;
   generate a three-dimensional ("3D") mesh representation of the garment based on the parametric representation of the garment; and
   generate a flat sewing pattern usable to physically produce one or more instances or variations of the garment, wherein the flat sewing pattern is generated at least in part by applying operations to flatten the 3D mesh representation.

2. The system of claim 1, wherein the at least one computing device is further configured to:
   prior to retrieving the data defining the parametric garment space, learn the parametric garment space, wherein learning the parametric garment space includes at least:
   obtaining a sample set of garment patterns of the first garment type;
   virtually draping, in virtual 3D space, 3D meshes representing each garment in the sample set of garment patterns to generate a plurality of draped 3D garment meshes;
   generating a flattened version of each of the plurality of draped 3D garment meshes;
   generating a low-dimensional embedding to represent each flattened version; and
   storing and associating with the first garment type, in an electronic data store, data defining the parametric garment space, wherein the parametric garment space contains the low-dimensional embeddings of the sample set.

3. The system of claim 1, wherein the flat sewing pattern defines two or more flat panels designated to be sewn together at one or more seams to physically produce an instance or variation of the garment.

4. The system of claim 1, wherein the at least one computing device is further configured to virtually drape the 3D mesh representation of the garment on a 3D representation of a human body to generate a rendered image depicting the garment as worn on the human body.

5. A computer-implemented method comprising:
   obtaining (a) a front image depicting a front view of a garment and (b) a back image depicting a back view of the garment, wherein the garment is of a first garment type, wherein the front image and back image each depict the garment laid flat or hung up;
   generating a front silhouette of the garment based on the front image and a back silhouette of the garment based on the back image;
   generating a parametric representation of the garment based on the front and back silhouettes of the garment, wherein the parametric representation of the garment is generated at least in part by iteratively optimizing a garment representation within a parametric garment space previously learned for the first garment type;
   generating a three-dimensional ("3D") mesh representation of the garment based on the parametric representation of the garment; and
   generating a flat pattern for the garment, wherein the flat pattern is generated at least in part by applying operations to flatten the 3D mesh representation.

6. The computer-implemented method of claim 5, wherein generating the front silhouette and the back silhouette includes segmenting each of the front image and back image from background image content.

7. The computer-implemented method of claim 5, wherein the parametric representation of the garment is further generated at least in part using differentiable rendering techniques in view of the parametric garment space previously learned for the first garment type.

8. The computer-implemented method of claim 5, further comprising learning the parametric garment space for the first garment type based in part on a plurality of sample garment patterns for garments of the first garment type.

9. The computer-implemented method of claim 8, wherein learning the parametric garment space for the first garment type comprises at least:
   obtaining a sample set of garment patterns of the first garment type;
   virtually draping, in virtual 3D space, 3D meshes representing each garment in the sample set of garment patterns to generate a plurality of draped 3D garment meshes;
   generating a flattened version of each of the plurality of draped 3D garment meshes;
   generating a low-dimensional embedding to represent each flattened version; and
   storing and associating with the first garment type, in an electronic data store, data defining the parametric garment space, wherein the parametric garment space contains the low-dimensional embeddings of the sample set.

10. The computer-implemented method of claim 9, wherein the low-dimensional embedding representing each flattened version has a lower number of dimensions than its corresponding flattened version.

11. The computer-implemented method of claim 8 further comprising generating at least a subset of the sample set of garment patterns by interpolating one or more reference garment patterns of the first garment type.

12. The computer-implemented method of claim 5, wherein applying the operations to flatten the 3D mesh representation comprises iteratively compressing the 3D mesh representation along one direction while expanding along at least one orthogonal direction.

13. The computer-implemented method of claim 12, wherein applying the operations to flatten the 3D mesh representation further comprises, during each of a plurality of iterations of iteratively compressing the 3D mesh representation:
- constraining normals of a plurality of triangles of the 3D mesh representation to remain parallel to a compression direction, and
- constraining a shape of a two-dimensional ("2D") view of the 3D mesh representation to correspond to an original shape of the garment as represented in the 3D mesh representation.

14. The computer-implemented method of claim 5, wherein generating the 3D mesh representation of the garment based on the parametric representation of the garment includes inverting at least one embedding transformation.

15. The computer-implemented method of claim 5, wherein iteratively optimizing the garment representation within the parametric garment space comprises optimizing over principal component analysis ("PCA") parameters.

16. The computer-implemented method of claim 5 further comprising virtually draping the 3D mesh representation of the garment on a 3D representation of a human body to generate a rendered image depicting the garment as worn on the human body.

17. Non-transitory computer readable media including computer-executable instructions that, when executed by a computing system, cause the computing system to perform operations comprising:
- obtaining (a) a front image depicting a front view of a garment and (b) a back image depicting a back view of the garment, wherein the garment is of a first garment type, wherein the front image and back image each depict the garment laid flat or hung up;
- generating a front silhouette of the garment based on the front image and a back silhouette of the garment based on the back image;
- generating a parametric representation of the garment based on the front and back silhouettes of the garment, wherein the parametric representation of the garment is generated at least in part by iteratively optimizing, using differentiable rendering techniques, a garment representation within a parametric garment space previously learned for the first garment type; and
- generating a three-dimensional ("3D") mesh representation of the garment based on the parametric representation of the garment.

18. The non-transitory computer readable media of claim 17, wherein the operations further comprise generating a flat pattern for the garment, wherein the flat pattern is generated at least in part by applying operations to flatten the 3D mesh representation.

19. The non-transitory computer readable media of claim 17, wherein the operations further comprise virtually draping the 3D mesh representation of the garment on a 3D representation of a human body to generate a rendered image depicting the garment as worn on the human body.

20. The non-transitory computer readable media of claim 17, wherein the operations further comprise learning the parametric garment space for the first garment type based in part on a plurality of sample garment patterns for garments of the first garment type.

* * * * *